Feb. 9, 1965  J. O. ROSS ETAL  3,168,940
TRAILER BRAKE ACTUATOR
Original Filed July 13, 1959

INVENTORS
JAMES O. ROSS
CLEMENT J. SMITH
BY
THEIR ATTORNEYS

United States Patent Office 3,168,940
Patented Feb. 9, 1965

3,168,940
TRAILER BRAKE ACTUATOR
James O. Ross, Fort Myers, Fla., and Clement J. Smith, Vandalia, Ohio, assignors to Toledo Stamping & Manufacturing Company, Toledo, Ohio, a corporation of Ohio
Continuation of application Ser. No. 826,821, July 13, 1959. This application Aug. 22, 1962, Ser. No. 218,794
1 Claim. (Cl. 188—112)

This invention relates to a novel automatic trailer brake actuator. More particularly, this invention relates to a novel control means for a brake actuator of the type that is operated by the momentum of a trailer when overtaking its towing vehicle, as a result of the towing vehicle coming to a stop or when the two vehicles are going down a hill. The towing vehicle may be an automobile, a truck, a tractor or the like. It will be clear from the following disclosure that this invention may be used in many types of towing devices and is not limited to towing devices for trailers.

Various automatic trailer brake actuating devices are known of the type having hydraulic mechanisms operated by relative movement between the trailer and the towing vehicle. Usually, provision is made for relative movement between the trailer tongue and a tow bar attached to the towing vehicle. In some of these devices, a hydraulic piston rod on the trailer tongue is struck by a part of the two bar mechanism, thereby actuating a hydraulic actuator mechanism also located on the tongue.

While prior art devices shown various types of actuators, it has been found that an improved actuator having a more positive action results by pivoting the piston rod directly to the tow bar. Thus, the hydraulic cylinder and piston are located on the tongue and the piston rod is located on the tow bar. By providing a simple adjusting device at the piston rod pivot, it is possible to accurately adjust the response characteristics of the brake actuator.

The primary object of this invention is to provide a novel brake actuating mechanism forming a part of a trailer hitch having an easily operated, yet positive and rugged means for insuring the optimum amount of braking at all times.

A further object of this invention is to provide novel means for adjusting the brake actuator when the trailer is accidentally detached from the towing vehicle.

Since the trailer will tend to override the towing vehicle when the two are driven in a reverse direction, or "backed up," provision must be made to prevent the brakes from engaging under such circumstances. Accordingly, another object of this invention is the provision of automatic brake release means which may be used when it is desired to back the trailer and the vehicle pulling the trailer.

The tow bar is connected to the trailer tongue by means of links, which, with the tow bar and tongue, form a parallelogram. When relative movement takes place between the trailer and the towing vehicle, the tongue and the tow bar, because of the parallelogram arrangement, remain parallel. The usual practice has been to place the tongue below the tow bar. However, since the device described below has an adjusting mechanism and pivot for the piston rod placed on the tow bar, it has been found advantageous to place the tow bar underneath the tongue. By making the tow bar "underslung" in this way, otherwise complex construction is overcome. Moreover, an unsightly appearance and bulky construction are avoided.

Therefore, it is a still further object of this invention to provide a trailer brake actuating mechanism located on the trailer tongue and the tow bar, having an adjusting device for the piston actuator, in which the tow bar is placed under the trailer tongue.

Other objects and advantages reside in the construction of parts, the combination thereof, the method of manufacture and the mode of operation, as will become more apparent from the following description.

Referring to the drawings.

Figure 1:
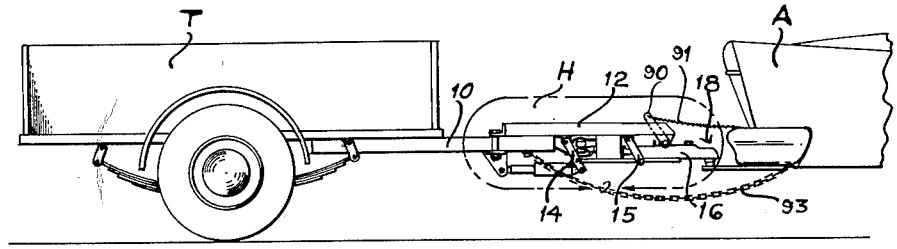
FIGURE 1 is a side elevational view which shows the relationship between the novel trailer hitch and brake actuator, the trailer and the automobile which pulls the trailer. For clarity, some parts of the brake actuator are omitted.

In FIGURE 1 the hitch H is shown as providing a connection between a towing automobile A and a trailer T. A hollow tongue 10 connected to the trailer T rigidly supports a channel member 12. Channel 12 is connected to a tow bar 16 which, in turn, is connected to the automobile A at 18.

Figure 2:
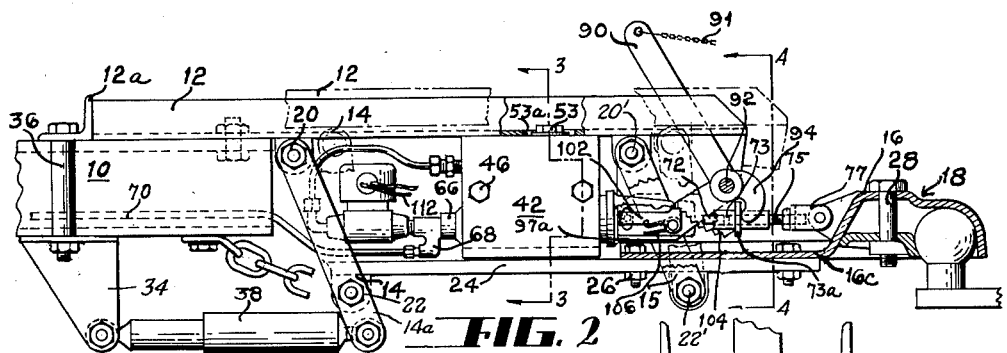
FIGURE 2 is a side elevational view, with parts broken away, of the portion of FIGURE 1 within the oval 2, showing on a large scale the novel hitch and brake actuator structure.
Figures 3, 4, 6:
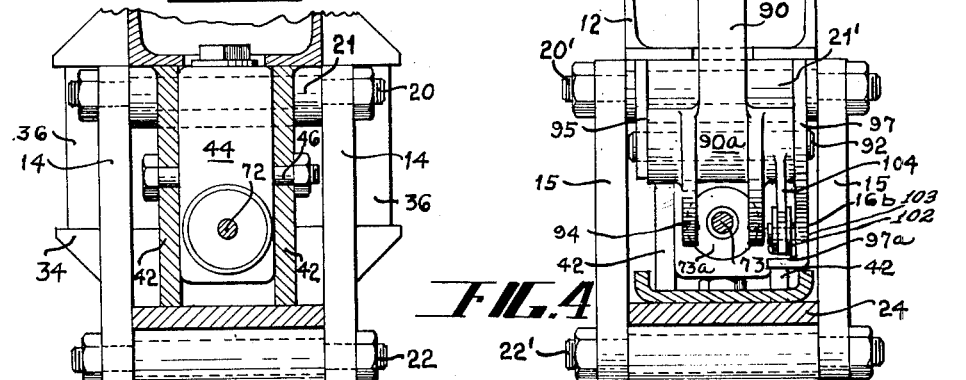
FIGURE 3 is an enlarged sectional view, taken substantially on line 3—3 of FIGURE 2.
FIGURE 4 is another enlarged sectional view, taken substantially on line 4—4 of FIGURE 2.
FIGURE 6 is an enlarged, fragmentary view of a portion of the apparatus of FIGURE 2.

Referring to FIGURES 2–4, it is seen that links 14 and 15 are connected to channel member 12 by means of bolts 20 and 20′ passed through depending brackets 21 and 21′ integral with or welded to channel member 12. Links 14 and 15 are connected to tow bar 16 by means of bolts 22 and 22′ passed through brackets 23 and 23′ integral with or welded to a plate 24 which is bolted, as at 26, to the bottom portion 16c of tow bar 16. Connection 18 comprises a conventional ball and socket arrangement which may be released by loosening bolt 28. To restrain relative motive between the hollow tongue 10 and to tow bar 16, a dashpot or shock absorber 38 is provided between those members. Dashpot 38 has one end connected to a bracket 34 and the other end connected to an extended portion 14a of the link 14. The bracket 34 is secured to the tongue 10 by bolts 36. By this arrangement, it can be readily seen that the relative movement of the ends of the dashpot is greater than the relative movement of the tongue 10 with respect to the tow bar 16. The dashpot 38 deters or resists relative movement between the tongue 10 and the tow bar 16.

As can be readily seen in FIGURE 2, the dashpot being mounted on the end of the link 14 below the point where the link 14 is attached to member 24, the stroke of the dashpot or shock absorber is greater than the relative movement between the tongue 10 and the tow bar 16. There are two advantages to this arrangement. The stroke of the dashpot or shock absorber, in addition to being greater than the relative movement between the tongue 10 and the tow bar 16, also results in the shock absorber being more effective than if it were connected directly between the tongue 10 and the tow bar 16. The shock absorber, being attached to the extreme end of the link 14, results in an advantageous leverage as far as the shock absorber is concerned.

The parts described form a complete connection or hitch between the automobile A and the trailer T. When in motion, the parts are in approximately the full line position shown in FIGURE 2. The dashpot or shock absorber 38 serves to prevent relative motion between the trailer and the automobile and keeps the trailer from hunting. Further means are provided to restrain relative motion between the tongue 10 and the tow bar 16, which means also serve as the actuator for hydraulic brakes contained in the trailer. This means will now be described in detail.

A pair of plates 42 is secured to the channel member 12 by welding, or in any other suitable manner. Plates 42 support therebetween a housing 44 for a conventional hydraulic cylinder and reservoir by means of bolt 46 which passes through openings 48 in housing 44. As shown best in FIGURE 5, housing 44 is divided into two sections by a wall 50, the upper section 52 forming a reservoir, the lower section 54 being a cylinder which houses a piston 56 having a rubber cup-shaped gasket 58 and a spring 60 which opposes movement of piston 56. Piston 56 is also provided with a conical extension 88 surrounded at one end by an annular bushing 89 to keep the piston accurately centered within the cylinder. Cap 53 is provided to insure ready access to reservoir 52 for checking the fluid level and for adding fluid if necessary. Conveniently, cap 53 extends through opening 53a in channel member 12. Control vents 62 and 64 provide communication between the reservoir portion 52 and the cylinder portion 54 of the housing. One end 66 of the housing is provided with a hydraulic connection 68 having an outlet 68a and a conduit 70 which passes through the hollow tongue 10 to a brake mechanism (not shown in the trailer. As will be apparent to those familiar with the art, movement of piston 56 to the left, as viewed in FIGURE 5, or conversely movement of cylinder 54 to the right, so that the cup-shaped gasket portion 58 extends to the left of the vent 62, will force hydraulic fluid through conduit 70 to the hydraulic brake mechanism in the trailer.

A piston rod 72 is attached to the piston 56. This piston rod passes through a resilient cup-shaped member 74 attached to an annular flange 76 on the housing 44. An annular recess 80 near the end of the flange 76 receives a rib 78 projecting inwardly at the end of the cup-shaped member 74. The cup-shaped member 74 acts as a dust cover, keeping out dust and other foreign material from the piston and the cylinder.

The end of the piston rod 72 projects into a tubular sleeve 73 and is fixedly secured thereto, so that the tubular sleeve and the rod 72 always move together. The opposite end of the tubular sleeve 73 has mounted therein a rod 75 adjustably connected to a lug 77 pivotally attached to the tow bar 16. The rod 75 is slidably mounted in the end of the tubular sleeve 73 and abuts the end of the rod 72 when the distance between the towing vehicle and the trailer is decreased by the inertia of the trailer. When the trailer is towed, the end of the rod 75 is spaced from the end of the rod 72, as clearly shown in dotted outline in FIGURE 2. The trailer may advance towards the towing vehicle a distance sufficient to close the gap between the end of the rod 75 and the end of the rod 72 without actuating the rod 72. This constitutes a lost motion mechanism. Thus, when the trailer advances towards the towing vehicle and when the gap between the rod 75 and the rod 72 has been closed, the rod 75 engages the end of the rod 72 to actuate the piston within the cylinder 54. In so doing, hydraulic fluid is supplied to the brakes.

The operation of the device thus far described is as follows. When in motion, the parts are in the full line position, as shown in FIGURE 2. However, if it is necessary to stop or retard the motion of the automobile, or to descend a hill, the inertia of the trailer tends to move it toward the automobile. This causes the tongue 10 and channel member 12 to move forward with respect to the tow bar 16 and take the position shown by the dotted lines shown in FIGURE 2, indicating the position of members 12, 14 and 74. At the same time, housing 44, which is rigidly connected to channel member 12, also moves forward, while piston 56 is actuated or moved to brake applying position by the piston rod 72; the tubular sleeve 73 and the lug 77 actuated by the tow bar 16. After a predetermined amount of movement of housing 44 and its cylinder 58 with respect to the piston 56, hydraulic fluid is forced through the conduit 70 to apply the hydraulic brake mechanism within trailer T. Once the trailer speed is retarded sufficiently by the brakes, the parts will return to the full line position shown in FIGURE 2 and the pressure on the hydraulic brakes in the trailer will be removed. If the trailer, the tongue 10 and the channel 12 again override the tow bar 16, the braking process will repeat itself.

Figure 5:
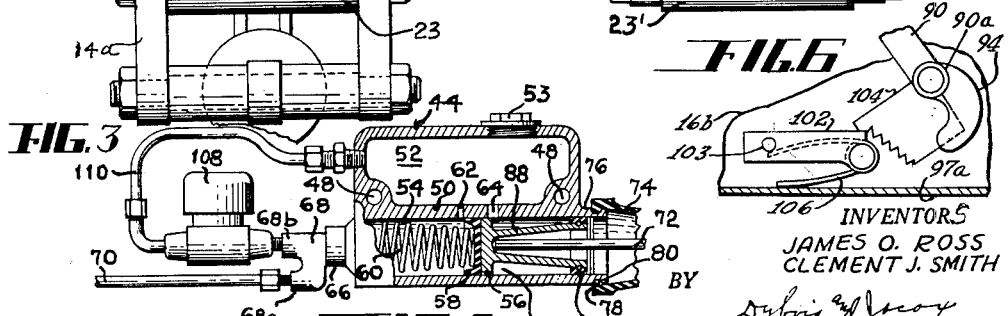
FIGURE 5 is a portion of the brake cylinder in section and parts associated therewith.

Any tendency of the trailer to hunt or jerk during the stopping process just outlined will be offset or restrained due to the shock absorber 38 and the cushioning provided by the hydraulic fluid, part of which occupies the space 86 behind piston 56 when the piston is actuated to the left, as shown in FIGURE 5. The lateral separation between channel member 12 and plate or bar 24 will vary slightly as the channel member overrides the bar 24. However, this has no effect on the operation of the piston rod 72 and piston 56, since the second rod 75 is pivoted to the tow bar 16 and the resilient or flexible cup 74 allows for movement of the rod 72. Extension 88, being conical, likewise does not interefere with pivotal movement of piston rod 72.

In the event the hitch is broken or the hitch should become detached from the towing vehicle, as for example if member 28 is loosened so as to release the hitch from the tow bar on the towing vehicle, the brake should then be applied to the towing vehicle so as to prevent an accident. This has been accomplished by means of a breakaway brake mechanism. The lever 90 is connected by a chain or cable 91 to the towing vehicle. This chain or cable has sufficient strength to actuate the lever 90, but not sufficient strength to tow the trailer. Safety chains 93 are used as a precautionary measure to prevent the trailer from being detached from the towing vehicle in case the hitch fails for any reason whatsoever. The chains 93 are sufficiently strong to tow the towing vehicle.

The lever 90 is pivotally mounted upon a pin 92 fixedly secured to a pair of brackets 95 and 97. These brackets are fixedly secured to the channel 12. A pair of members or lugs 94, integral with the lever 90, engage a flange 73a fixedly attached to the tubular sleeve 73. As the lever 90 is rotated in a clockwise direction, as viewed in FIGURE 2, members 94 actuate the flange 73a and with it the tubular sleeve 73 and the piston rod 72, to apply the brakes to the trailer before the chain 91 snaps or breaks. As the brakes are applied to the trailer and the towing vehicle continues to travel, the application of the brakes will increase the force required to tow the towing vehicle to cause the chain 91 to break, at which time the safety chains 93 tow the trailer independently of the hitch. Being the brakes have been set on the trailer and if there is sufficient load on the trailer to create sufficient friction between the trailer wheels and the pavement, the trailer brakes may be sufficiently strong to arrest the movement of the towing vehicle. In actual tests, the brakes on the trailer have been sufficiently strong to stop a coasting automobile used as a towing vehicle in a very short distance. As the lever 90 is rotated in a clockwise direction, a ratchet 104 integral with the lever is also rotated in a clockwise direction. A pawl 102 engages the ratchet and locks it in position. This pawl is pivotally supported by the wall 16b through a pivot pin 103 and is urged into engagement with the ratchet by a spring 106 resting upon a flange 97a integral with the bracket 97. That being the case, when the lever 90 has been rotated in a clockwise direction, it, so to speak, locks the hydraulic brakes in braking position.

In the event it is desired to back the automobile, it is obvious that the trailer would again tend to override the tow bar 16, thereby actuating the trailer brakes. To prevent the brakes from being actuated under such circumstances, a bypass valve for the hydraulic fluid is provided. This valve is shown at 108 in FIGURE 5 and is connected to outlet 68b of the hydraulic coupling 68. Conduit means 110 are provided so that the fluid displaced through the valve returns to reservoir 52. Valve 108 is a conventional electromagnetic valve and is provided with leads 112, as shown in FIGURE 2, which at their opposite ends are connected in any suitable manner (not shown) to the back-up lights on the automobile. Thus, when the automobile is put into reverse, both the back-up lights and valve 108 are energized and the fluid is free to travel from the cylinder through the valve 108 and conduit 110 into the reservoir 52.

After backing the trailer and it is desired to move forward, the electromagnetic valve 108 will automatically close upon de-energizing the back-up lights. If the piston is to the left of vents 62 and 64 when the valve is closed, there will be fluid on the right side of piston 56 within cavity 86. However, this position of the piston will not prevent the trailer from moving forward, since the piston will return to the right, as viewed in FIGURE 5. This is possible, not only because some of the fluid will be returned to reservoir 52 through vents 62 and 64, but also, the rim of the cup-shaped gasket 58 will flex, permitting fluid to enter the left cylinder portion 54.

Thus, the device described herein provides a compact, positive and reliable braking actuator having provisions for allowing for reversal of the trailer without external control.

This application is a continuation of our copending application, Serial No. 826,821, now abandoned.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

We claim:

A hitch for connecting a towing vehicle to a trailing vehicle having a hydraulic brake, said hitch comprising a tongue member on said trailing vehicle, a tow bar member adapted to be mounted on the towing vehicle, means connecting said tow bar member and said tongue member to enable relative movement therebetween, shock absorber means mounted on one of said members and structurally connected to said other member to resist movement between said members both in directions toward one another and away from one another, a hydraulic cylinder having a piston therein, said cylinder being mounted on one of said members, said piston being movable in said cylinder and capable of supplying brake fluid under pressure to actuate the brake mechanism, piston rod means connected to said piston, link means for pivotally connecting said piston rod means directly to the other of said members tending to cause movement of said piston rod means at least equal to the movement of said members toward one another, said piston rod means being movable independently of said link means in a direction away from said link means, whereby said piston can be actuated through said piston rod means independently of said link means and independently of the relative movement of said two members, and emergency means for moving said piston to actuate said brake mechanism in the event of a break-away of said tow bar member, said emergency means including a lever, flexible means adapted to connect said lever to the towing vehicle independently of said tow bar member, means pivotally connecting said lever to the member on which said cylinder is mounted, flange means functionally integral with said piston rod means, said lever being positioned to contact said flange means directly and to actuate said piston rod means, the independent movement of said link means and said piston rod means enabling said piston rod means to move toward said cylinder independently of the relative movement of said two members, independently of said connecting means, and independently of said shock absorber means, when said lever is moved by said flexible means, a ratchet affixed to one of said lever and the member to which said lever is attached, a pawl affixed to the other of said lever and the member to which said lever is attached and engageable with said ratchet in all positions of said lever, and a spring engaged with the same one of said lever and the member as said pawl to urge said pawl toward said ratchet to prevent the return of said lever to its original position after being moved by said flexible means.

References Cited in the file of this patent

UNITED STATES PATENTS

| | | |
|---|---|---|
| 1,896,427 | Selvester | Feb. 7, 1933 |
| 2,101,600 | Sandul | Dec. 7, 1937 |
| 2,135,097 | Billingsley | Nov. 1, 1938 |
| 2,211,025 | Parkes | Aug. 13, 1940 |
| 2,846,030 | Wade | Aug. 5, 1958 |
| 2,954,104 | Shumate | Sept. 27, 1960 |

UNITED STATES PATENT OFFICE
CERTIFICATE OF CORRECTION

Patent No. 3,168,940                         February 9, 1965

James O. Ross et al.

It is hereby certified that error appears in the above numbered patent requiring correction and that the said Letters Patent should read as corrected below.

Column 1, line 31, for "shown" read -- show --; column 2, line 15, for "large" read -- larger --; line 41, for "motive" read -- motion --; line 42, for "to" read -- the --; column 3, line 27, after "shown" insert a closing parenthesis.

Signed and sealed this 3rd day of August 1965.

(SEAL)
Attest:

ERNEST W. SWIDER  
Attesting Officer

EDWARD J. BRENNER  
Commissioner of Patents